(12) United States Patent
Kim et al.

(10) Patent No.: US 8,839,482 B2
(45) Date of Patent: Sep. 23, 2014

(54) METHOD OF ASSEMBLING METAL CLAMP AND BODY SPRINGS OF WIPER BLADE FOR VEHICLE AND ASSEMBLY

(75) Inventors: Tae Hun Kim, Daegu (KR); Sang Cheol Lee, Daegu (KR); Dong Geun Lee, Kimcheon Si (KR); Yong Ki Choi, Daegu (KR)

(73) Assignee: CAP Corporation, Daegu (KR)

( * ) Notice: Subject to any disclaimer, the term of this patent is extended or adjusted under 35 U.S.C. 154(b) by 191 days.

(21) Appl. No.: 12/618,738

(22) Filed: Nov. 15, 2009

(65) Prior Publication Data

US 2011/0041280 A1 Feb. 24, 2011

(30) Foreign Application Priority Data

Aug. 21, 2009 (KR) ........................ 10-2009-0077656

(51) Int. Cl.
*B60S 1/02* (2006.01)
*B60S 1/38* (2006.01)

(52) U.S. Cl.
CPC .............. *B60S 1/3858* (2013.01); *B60S 1/3879* (2013.01); *B60S 1/3855* (2013.01)
USPC .................................. 15/250.32; 15/250.201

(58) Field of Classification Search
USPC ........................... 15/250.32, 250.201, 250.43
See application file for complete search history.

(56) References Cited

U.S. PATENT DOCUMENTS

| 7,587,783 | B1 * | 9/2009 | Lin | ............................. | 15/250.43 |
| 8,037,568 | B2 * | 10/2011 | Lee et al. | .................... | 15/250.32 |
| 2005/0251946 | A1 * | 11/2005 | Heinrich et al. | ........... | 15/250.32 |
| 2006/0026786 | A1 * | 2/2006 | Ku | ............................. | 15/250.32 |

FOREIGN PATENT DOCUMENTS

WO WO2007051669 A1 5/2007

\* cited by examiner

*Primary Examiner* — Basil Katcheves
(74) *Attorney, Agent, or Firm* — AKC Patents LLC; Aliki K. Collins (57) ABSTRACT

Disclosed is a method of assembling a metal clamp and body springs of a wiper blade for vehicles, and an assembly. The method includes forming a plurality of through holes at major sides of the body springs, forming a plurality of protrusions corresponding to the through holes at a major side of the clamp such that the protrusions extend outward from the major side of the clamp, inserting the protrusions of the clamp into the respective through holes of the body springs, fixing the protrusions, which are located in the respective through holes, in the respective through holes by pressure welding or riveting such that the clamp is mounted to the body springs.

7 Claims, 7 Drawing Sheets

METHOD OF ASSEMBLING METAL CLAMP AND BODY SPRINGS OF WIPER BLADE FOR VEHICLE AND ASSEMBLY

TECHNICAL FIELD

The present invention relates to a method of assembling a metal clamp and body springs of a wiper blade for vehicles.

BACKGROUND ART

Generally, a wiper mounted to a wind shield glass of a vehicle serves to prevent forward visibility of a driver from being disturbed due to rain or snow present on the wind shield glass during driving of the vehicle in rain or in snow and, in addition, to wipe the wind shield glass clean. Specifically, a wiper system is mounted at a predetermined part of a chassis of the vehicle below the wind shield glass of the vehicle, and a wiper blade performs reciprocation, i.e., alternating motions, on the wind shield glass from side to side in a fan shape when the wiper blade is driven by a motor.

Such a wiper blade for wiping foreign matter off a wind shield glass of a vehicle is disclosed in Korean Patent Application No. 2005-12755, which has been filed in the name of the applicant of the present application.

The conventional wiper blade includes body springs integrally formed and having a long groove formed at middle regions of the body springs, such that a fixing coupling member is fitted in the long groove, in the longitudinal direction thereof for supporting the wiper blade, the fixing coupling member fitted in the long groove of the body springs such that a rubber is fixedly coupled to the body springs, the fixing coupling member having clip fitting grooves formed at the upper part thereof and protrusions formed at the lower part thereof such that the protrusions are fitted in fitting grooves formed at the rubber, clips fitted in the clip fitting grooves formed at the upper part of the fixing coupling member for fixing the upper sides of the body springs in a tight contact manner, the rubber having the fitting grooves, in which the protrusions of the fixing coupling member are fitted, formed at the upper part thereof, the lower part of the rubber being in tight contact with a wind shield glass of a vehicle for wiping the wind shield glass clean, and a spoiler having depressions formed at opposite sides thereof in the longitudinal direction of the body springs.

In the conventional wiper blade, however, the rubber is fixedly coupled to the body springs by the fixing coupling member, and the fixing coupling member is in tight contact with the upper sides of the body springs by the clips. As a result, the number of parts to be assembled is large, and therefore, the structure of the wiper blade is very complicated while manufacturing costs of the wiper blade are greatly increased. In addition, a process of assembling the wiper blade is also complicated in proportion to the number of parts to be assembled, with the result that assembly productivity is also deteriorated.

In order to solve the above problem, on the other hand, there has been proposed a wiper blade including a clamp, made of a plastic material, to which an adapter mounted to an arm connected to a chassis of a vehicle is detachably mounted and body springs for elastically supporting a rubber configured to wipe a wind shield glass clean, the assembly between the clamp and the body springs being achieved by mounting pins.

Meanwhile, a wiper blade serves to not only wipe rain off a wind shield glass but also remove snow from the wind shield glass. In the conventional wiper blade including the clamp made of the plastic material, the clamp has toughness and ductility lower than those of a clamp which is made of a metal material although the plastic clamp may be easily manufactured by injection molding. As a result, the conventional wiper blade does not satisfy a snow block test during development of products, and, in addition, the shape of the clamp may be deformed.

Also, when the clamp is coupled to the body springs using the mounting pins positioned between the clamp and the body springs, assembly tolerance occurs between the clamp and the body springs. As a result, the coupling between the clamp and the body springs may loosen during use of the wiper blade for a long period of time, and therefore, the wiper blade may malfunction and thus stable use of the wiper blade may not be achieved.

Figure 11:
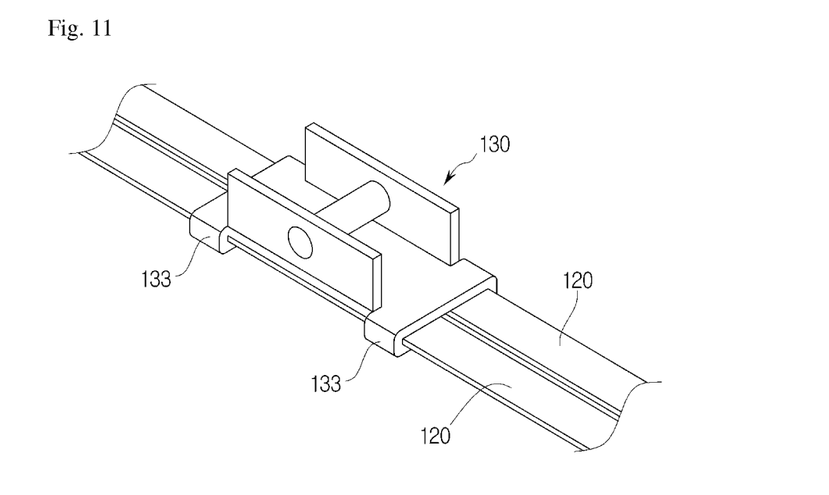
FIG. 11 is a perspective view illustrating a state in which a conventional clamp is coupled to conventional body springs.
Figure 12:
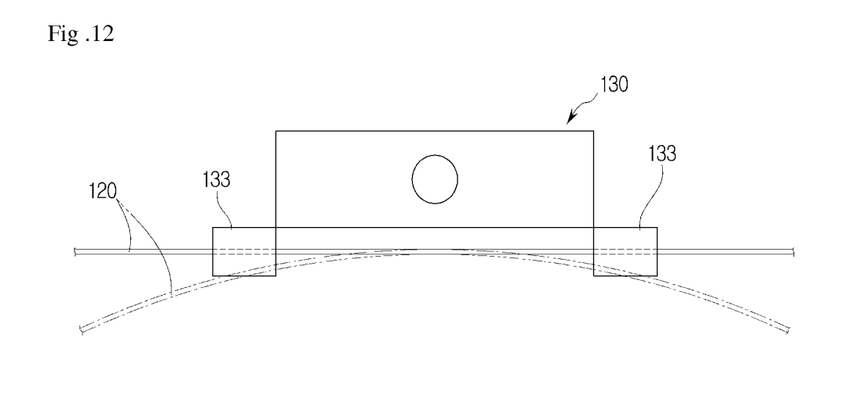
FIG. 12 is a side view of the clamp and the body springs shown in FIG. 11.

For a conventional clamp 130 made of a metal material as shown in FIG. 11, on the other hand, a pair of support members 133 are configured to support body springs 120 at opposite ends of the body springs 120 in the longitudinal direction of the body springs 120. As a result, the overall size of the clamp 130 is large, and therefore, material costs are increased. Also, in order for a wiper blade to be in tight contact with a wind shield glass of a vehicle, it is necessary for each of the body springs 120 to have a predetermined radius of curvature as indicated by a dashed dotted line in FIG. 12. However, the distance between the support members 133 of the conventional clamp 130, which support the body springs 120, is large. When the clamp 130 is coupled to the body springs 120, therefore, the radius of curvature of each of the body springs 120 is changed, as indicated by a solid line in FIG. 12, with the result that opposite ends of the wiper blade are not in tight contact with the wind shield glass of the vehicle, whereby the wiping performance of the wiper blade is deteriorated.

DISCLOSURE

Technical Problem

Therefore, the present invention has been made in view of the above problems, and it is an object of the present invention to provide a method of assembling a metal clamp and body springs of a wiper blade for vehicles that is capable of achieving secure coupling between the clamp and the body springs and reducing deformation in shape of the clamp, thereby achieving stable use of a wiper blade in snow as well as in rain and, in addition, improving rigidity of the wiper blade.

Technical Solution

In accordance with the present invention, the above and other objects can be accomplished by the provision of a method of assembling a metal clamp and body springs of a wiper blade for vehicles, the wiper blade including a rubber disposed in tight contact with a wind shield glass of a vehicle to which the wiper blade is mounted for wiping foreign matter off the wind shield glass, the body springs elastically supporting the rubber, the body springs being made of a metal material, an adapter mounted to an arm connected to a chassis of the vehicle, and the clamp to which the adapter is detachably mounted, the clamp being made of a metal material, the method including forming a plurality of through holes at major sides of the body springs, forming a plurality of protrusions corresponding to the through holes at a major side of the clamp such that the protrusions extend outward from the major side of the clamp, inserting the protrusions of the clamp into the respective through holes of the body springs, fixing the protrusions, which are located in the respective through holes, in the respective through holes by pressure welding or riveting such that the clamp is mounted to the body springs.

The protrusions of the clamp may be formed in a protruding manner by pressing.

The method may further include bending the body springs such that each of the body springs has a predetermined radius of curvature after the step of forming the through holes at the body springs.

Advantageous Effects

According to the technical solution of the present invention as described above, it is possible to achieve secure coupling between the clamp and the body springs and to reduce deformation in shape of the clamp, thereby achieving stable use of a wiper blade in snow as well as in rain and, in addition, improving rigidity of the wiper blade.

DESCRIPTION OF DRAWINGS

The above and other objects, features and other advantages of the present invention will be more clearly understood from the following detailed description taken in conjunction with the accompanying drawings, in which.

BEST MODE

Now, an embodiment of the present invention will be described in detail with reference to the accompanying drawings.

Figure 1:
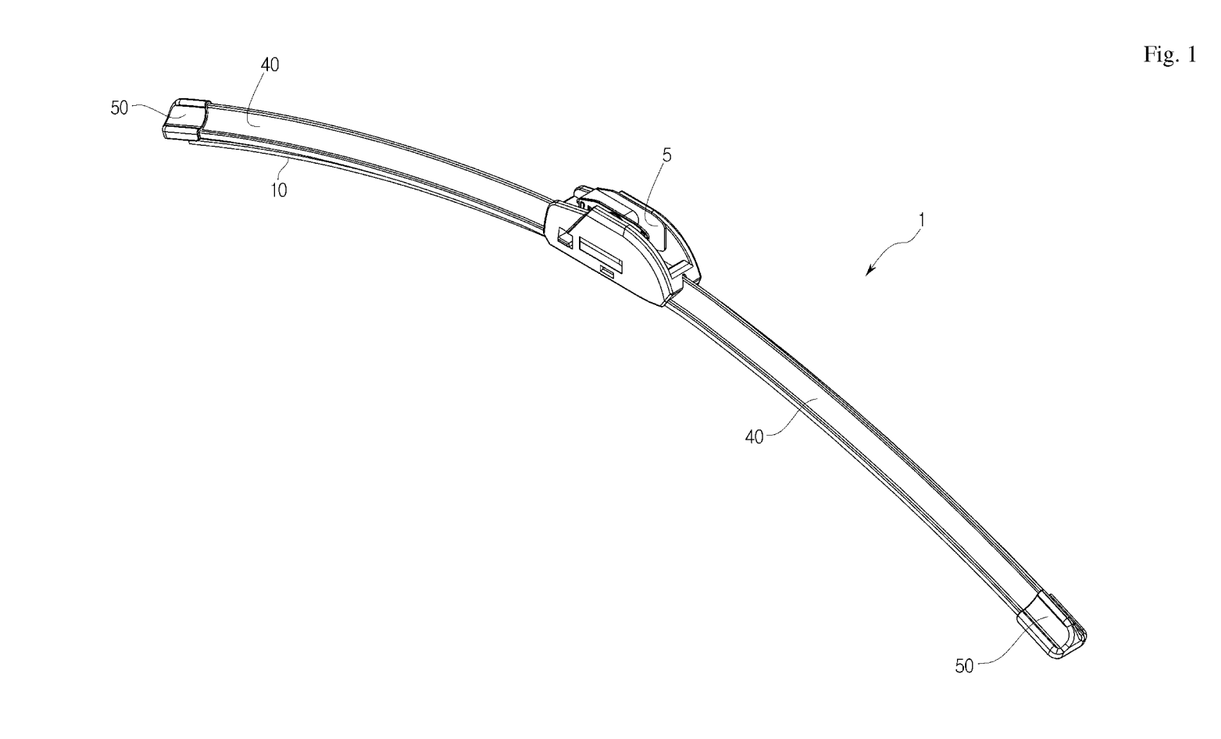
FIG. 1 is a perspective view illustrating a wiper blade according to an embodiment of the present invention.
Figure 2:
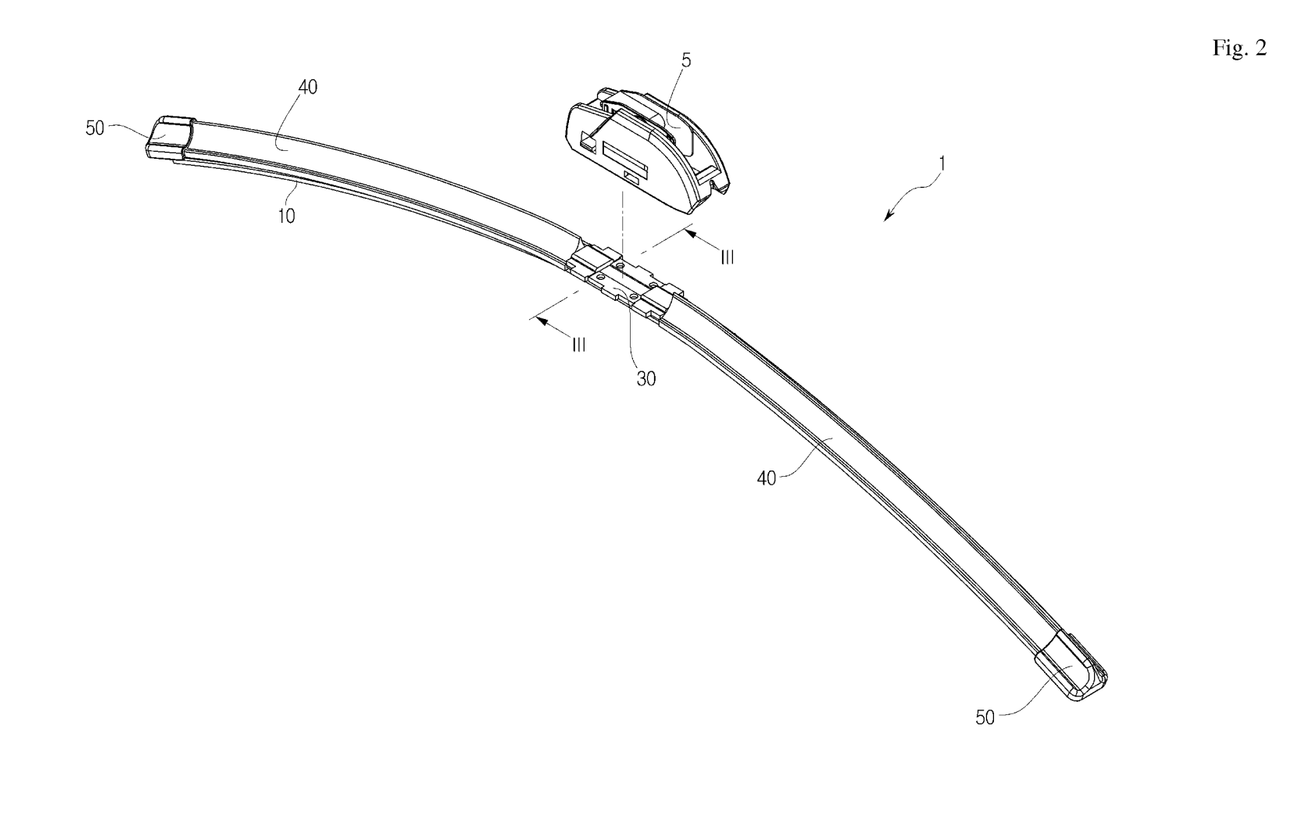
FIG. 2 is an exploded perspective view of the wiper blade according to the embodiment of the present invention shown in FIG. 1.
Figure 3:
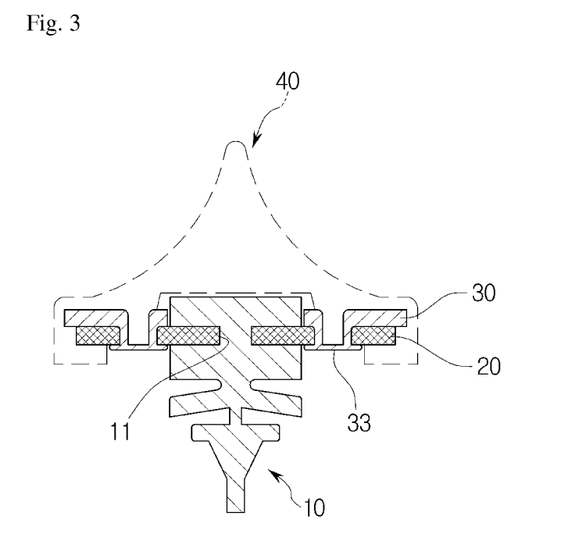
FIG. 3 is a sectional view taken along line of FIG. 2.

FIGS. 1 to 3 illustrate a wiper blade 1 for vehicles according to an embodiment of the present invention.

The wiper blade 1 for vehicles according to the embodiment of the present invention includes a rubber 10, body springs 20, and a clamp 30.

The rubber 10 has a predetermined length. The rubber 10 is elastically supported by the body springs 20, such that the rubber 10 is in tight contact with a wind shield glass of a vehicle to which the wiper blade for vehicles according to the embodiment of the present invention is applied, for wiping foreign matter off the wind shield glass. The rubber 10 is provided at opposite sides of the top thereof with coupling grooves 11, which extend in the longitudinal direction of the rubber 10. The bottom of the rubber 10 is in tight contact with the wind shield glass of the vehicle for securing high forward visibility.

In this embodiment, the body springs 20 are provided in a pair. Each of the body springs 20 is configured in the form of a belt having a predetermined length. Each of the body springs 20 is made of a metal material. A plurality of through holes 21, in which protrusions 33 of the clamp 30, which will be described later, are fixed by pressure welding or riveting, are formed in the middle of each of the body springs 20.

The body springs 20 serve to support the wiper blade 1. The clamp 30 is coupled to the body springs 20. At the same time, the rubber 10 is coupled to the body springs 20 such that flexibility and elasticity of the rubber 10 are maintained by the body springs 20. Consequently, the body springs 20 serve to enable the rubber 10 to be in tight contact with various types of wind shield glasses.

Each of the body springs 20 may be bent so as to have a predetermined radius of curvature corresponding to the wind shield glass of the vehicle.

To the clamp 30 is detachably coupled an adapter 5 to which an arm connected to a chassis of the vehicle is mounted. The clamp 30 is coupled to the body springs 20. The clamp 30 is made of a metal material exhibiting higher toughness and ductility than a conventional plastic material such that the clamp 30 satisfies a snow block test and exhibits reduced deformation in shape.

A rubber passageway 31 is formed in a depressed manner at a major side of the clamp 30 facing the body springs 20 such that the upper part of the rubber 10 passes through the rubber passageway 31.

Also, a plurality of protrusions 33 are provided at the major side of the clamp 30 facing the body springs 20 such that the rubber passageway 31 is disposed between the protrusions 33. Each of the protrusions 33 is configured in the form of a cylinder opened at one end thereof by pressing. The protrusions 33 are integrally formed at the major side of the clamp 30 such that the protrusions 33 extend outward from the major side of the clamp 30. Preferably, each of the protrusions 33 has a height greater than the thickness of each of the body springs 20 and, at the same time, a diameter equal to or less than that of each of the through holes 21 of the body springs 20.

Meanwhile, the protrusions 33 integrally formed at the major side of the clamp 30 such that the protrusions 33 extend outward from the major side of the clamp 30 are fixed in the respective through holes 21 of the body springs 20 by pressure welding or riveting using a press or the like. As a result, the clamp 30 is securely coupled to the body springs 20 without the occurrence of assembly tolerance, and therefore, the coupling between the clamp 30 and the body springs 20 is prevented from loosening even when the wiper blade 1 is used for a long period of time, thereby achieving optimum wiping performance of the wiper blade 1.

Unexplained reference numeral 40 indicates a pair of spoilers. The spoilers 40 surround opposite-side parts of the body springs 20 in a state in which the clamp 30 is disposed between the spoilers 40. The spoilers 40 serve to prevent the wiper blade 1 from rising during high-speed travelling, thereby improving wiping efficiency of the wiper blade 1.

Unexplained reference numeral 50 indicates a pair of end caps. The end caps 50 are mounted to opposite ends of the body springs 20 for providing an aesthetically pleasing appearance to the wiper blade 1 at the opposite ends thereof and, in addition, preventing the opposite ends of the body springs 20 from being damaged due to external impact or environmental wear.

Hereinafter, a method of assembling a metal clamp and body springs of a wiper blade for vehicles according to an embodiment of the present invention will be described.

Figure 4:
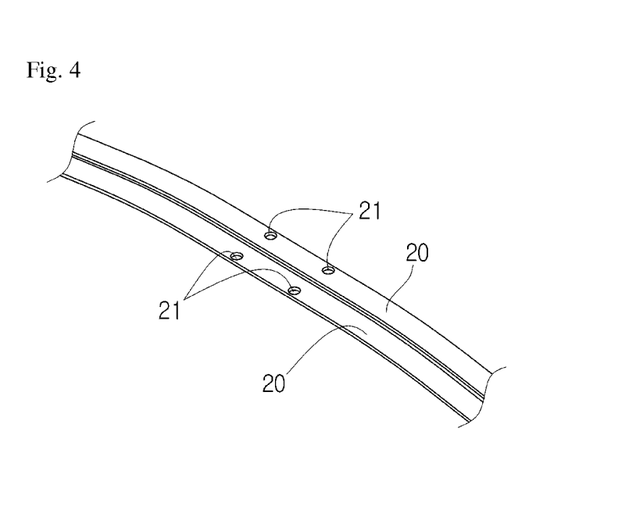
FIG. 4 is an enlarged perspective view, in part, illustrating through holes formed in body springs of the wiper blade according to the embodiment of the present invention shown in FIG. 1.

First, as shown in FIG. 4, a plurality of through holes 21 are formed at major sides of body springs 20 using a press (not shown).

Figure 5:
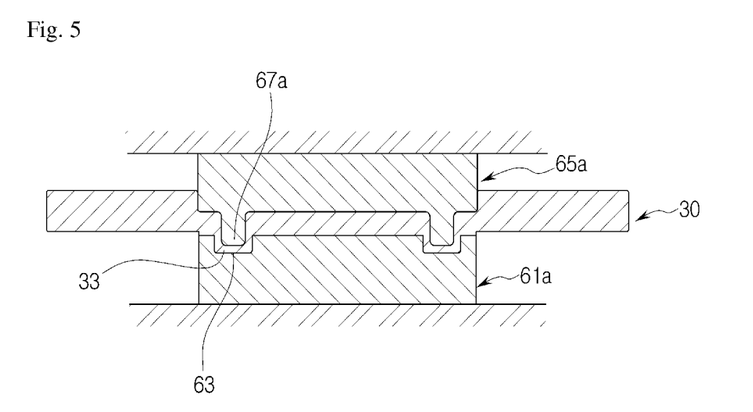
FIG. 5 is a sectional view illustrating a process for forming protrusions at a clamp of the wiper blade according to the embodiment of the present invention shown in FIG. 1.
Figure 6:
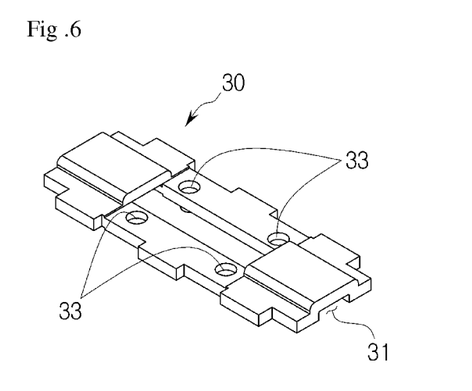
FIG. 6 is a perspective view of the clamp manufactured by the process shown in FIG. 5.

Subsequently, as shown in FIG. 5, a clamp 30 is located on a bed 61a of the press in which a plurality of grooves 63 are formed, and a ram 65a of the press having a plurality of jigs 67a each having an outer diameter less than that of each of the grooves 63 of the bed 61a is lowered toward the bed 61a to form a plurality of protrusions 33 corresponding to the respective through holes 21 of the body springs 20 at a major side of the clamp 30 such that the protrusions 33 extend outward from the major side of the clamp 30, as shown in FIG. 6.

At this time, each of the protrusions 33 has a height greater than the thickness of each of the body springs 20 and, at the same time, a diameter equal to or less than that of each of the through holes 21 of the body springs 20, by pressing. Also, the protrusions 33 are formed at the major side of the clamp 30 such that the protrusions 33 extend outward from the major side of the clamp 30. Each of the protrusions 33 is configured in the form of a cylinder opened at one end thereof.

Figure 7:
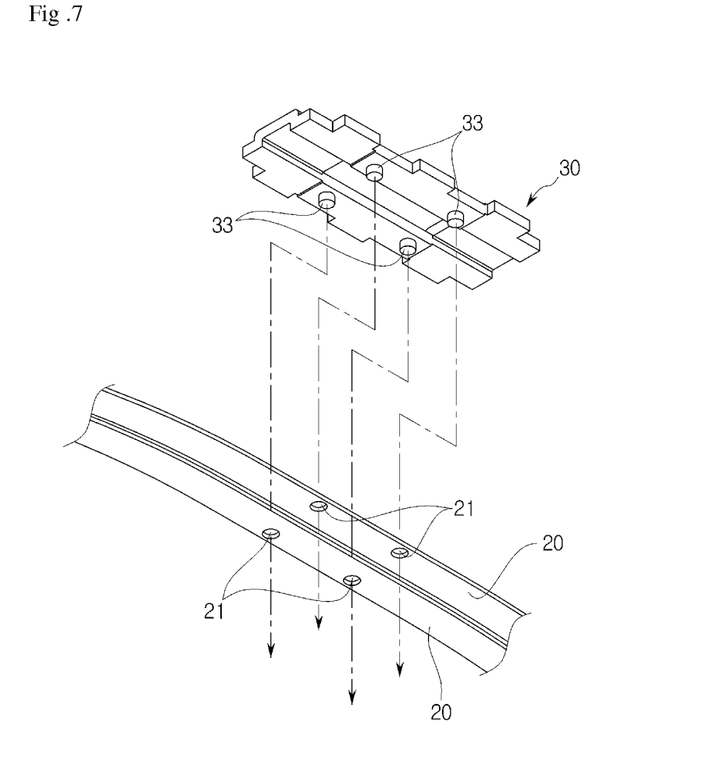
FIG. 7 is an exploded perspective view illustrating the clamp and the body springs before assembly.
Figure 8:
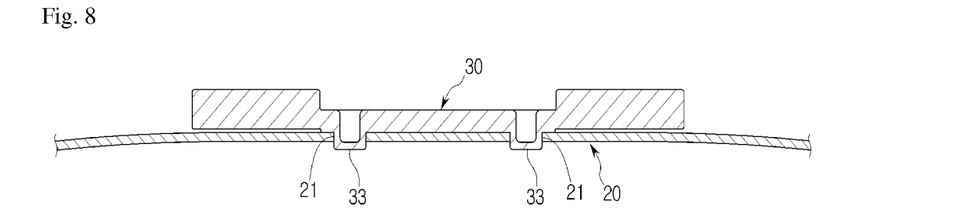
FIG. 8 is a sectional view illustrating a state in which the protrusions of the clamp shown in FIG. 7 are fitted in the respective through holes of the body springs shown in FIG. 7.

Subsequently, as shown in FIG. 8, the protrusions 33 of the clamp 30 are inserted into the respective through holes 21 of the body springs 20. FIG. 7 is an exploded perspective view illustrating the clamp 30 and the body springs 20 before assembly, i.e., before the protrusions 33 of the clamp 30 are inserted into the respective through holes 21 of the body springs 20.

Figure 9:
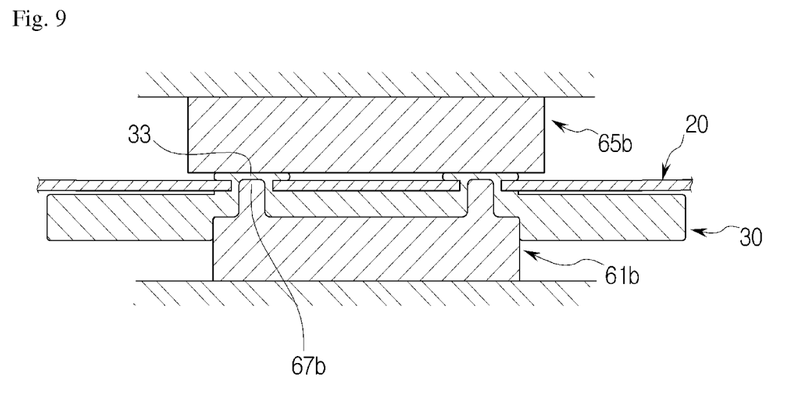
FIG. 9 is a sectional view illustrating a process for fixing the protrusions of the clamp in the through holes of the body springs of the wiper blade according to the embodiment of the present invention shown in FIG. 1 by pressure welding.

Subsequently, as shown in FIG. 9, the body springs 20, to which the clamp 30 is temporarily assembled, are disposed between the bed 61b of the press having the jigs 67b, each of which is configured in a shape corresponding to the inner diameter of each of the protrusions 33 and the ram 65b of the press, and the ram 65b of the press is lowered toward the bed 61b of the press such that the protrusions 33 of the clamp 30, which are located in the through holes 21 of the body springs 20, are fixed in the through holes 21 of the body springs 20 by pressure welding. In this way, the clamp 30 is mounted to the body springs 20.

Figure 10:
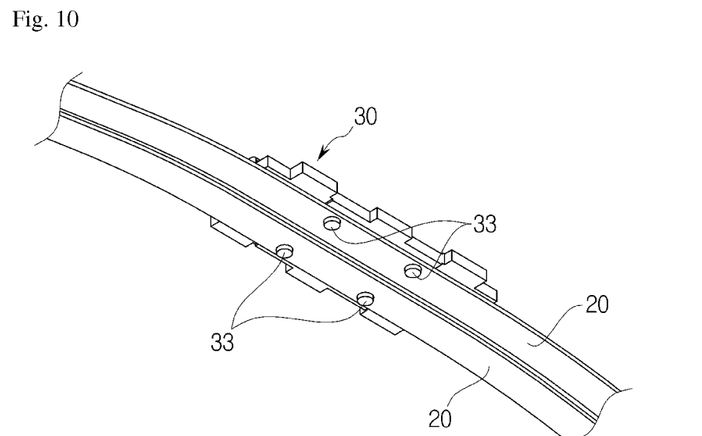
FIG. 10 is a perspective view of the clamp and the body springs manufactured by the process shown in FIG. 9.

As a result, the assembly of the metal clamp 30 and the body springs 20 of the wiper blade 1 for vehicles is completed as shown in FIG. 10. After the assembly, the clamp 30 is securely coupled to the body springs 20 without the occurrence of assembly tolerance, and therefore, the coupling between the clamp 30 and the body springs 20 is prevented from loosening even when the wiper blade 1 is used for a long period of time, thereby achieving stable use of the wiper blade 1. Also, the clamp 30 is made of a metal material exhibiting higher toughness and ductility than a conventional plastic material. Consequently, the coupling between the clamp 30 and the body springs 20 is achieved without trouble even during pressure welding using the press, thereby exhibiting excellent coupling efficiency, satisfying a snow block test, and exhibiting reduced deformation in shape.

After the through holes 21 are formed in the body springs 20, the body springs 20 may be bent such that each of the body springs 20 has a predetermined radius of curvature corresponding to a wind shield glass of a vehicle to which the present invention is applied.

Subsequently, corresponding edges of the respective body springs 20 are coupled into a pair of the coupling grooves 11 formed along opposite sides of a rubber 10 in a sliding manner to achieve the assembly between the body springs 20 and the rubber 10, and a pair of spoilers 40 are coupled to the body springs 20 while the clamp 30 is disposed between the spoilers 40.

Finally, end caps 50 are mounted to opposite ends of the body springs 20. In this way, the assembly of the wiper blade 1 is completed.

MODE FOR INVENTION

Various embodiments have been described in the best mode for carrying out the invention.

INDUSTRIAL APPLICABILITY

According to the present invention, as is apparent from the above description, a plurality of protrusions are formed at a major side of a clamp, which is made of a metal material, in a protruding manner such that the protrusions correspond to through holes formed in body springs, the protrusions of the clamp are fixed in the corresponding through holes of the body springs by pressure welding or riveting such that the clamp is mounted to the body springs, thereby achieving secure coupling between the clamp and the body springs, reducing deformation in shape of the clamp, and achieving stable use of a wiper blade in snow as well as in rain. Consequently, the present invention with the above-stated construction has industrial applicability.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method, comprising:
providing body springs and a rubber, the body springs being made of a metal material;
providing a metal clamp in a horizontal plate shape, the clamp having horizontal protrusions at both sides thereof respectively;
providing an adaptor to be coupled to a vehicle, the adaptor having insertion holes at both side faces thereof respectively;
forming a plurality of through holes through major sides of the body springs;
pressure-forming a plurality of protrusions corresponding to the plurality of through holes at a major side of the metal clamp such that the plurality of protrusions extend outward from the major side of the clamp, a height of the plurality of protrusions being larger than a vertical length of the plurality of holes;
inserting the plurality of protrusions of the clamp into the respective plurality of through holes of the body springs so that a portion of each of the plurality of protrusions is outside of each of the plurality of through holes;
pressure-deforming the portions of the plurality of protrusions outside of the plurality through holes such that the press-deformed portions enable tight fixation between the metal clamp and the body springs;

coupling the rubber to the body springs; and coupling the adaptor to the metal clamp by inserting the horizontal protrusions of the clamp to the insertion holes of the adaptor respectively.

2. The method according to claim 1, further comprising bending the body springs such that each of the body springs has a predetermined radius of curvature after forming the plurality of through holes at the body springs.

3. The method of claim 1, wherein the pressure-forming of the plurality of protrusions comprises pressure-forming using a first bed and ram.

4. The method of claim 3, wherein the pressure-deforming of the portions of the protrusions comprises pressure-deforming using a second bed and ram.

5. The method of claim 4, wherein the pressure-forming of the plurality of protrusions comprises forming the plurality of protrusions, each protrusion having an open end formed therein.

6. The method of claim 5, wherein the first ram and the second bed include a plurality of jigs, each jig corresponding each protrusion.

7. The method of claim 6, wherein the pressure-deforming of the portions of the protrusions comprises inserting the jigs of the second bed into the protrusions.

\* \* \* \* \*